Aug. 30, 1932.  W. F. DEHUFF  1,874,920
DOUGH MIXING MACHINE
Filed Oct. 23, 1931
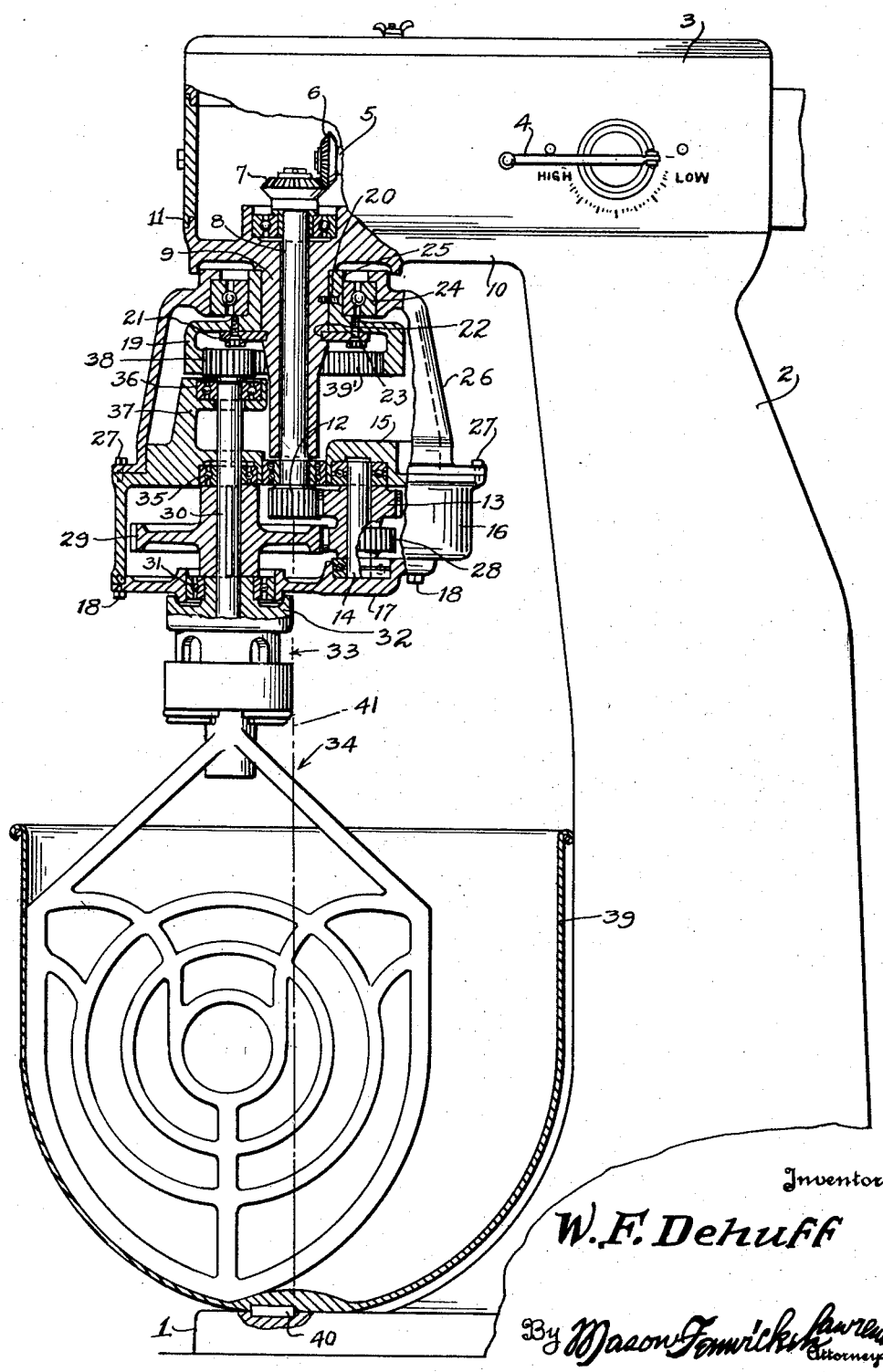
Inventor
W. F. Dehuff
By Mason Fenwick & Lawrence
Attorneys Patented Aug. 30, 1932

1,874,920

UNITED STATES PATENT OFFICE

WALTER F. DEHUFF, OF GLEN ROCK, PENNSYLVANIA

DOUGH MIXING MACHINE

Application filed October 23, 1931. Serial No. 570,711.

The invention forming the subject matter of this application relates to dough mixing machines of the power type, and is an improvement over the machine covered by my United States Patent No. 1,656,665, January 17, 1928.

In common with the aforesaid patented invention, the present invention is designed to effect a very powerful rotary and planetary movement of a dough beater by a substantially direct drive, through, suitable reduction gearing, from a variable speed motor mechanism.

The main object of the present invention is to simplify the mechanism described in the aforesaid patent, and to substitute for the expensive internal worm gearing thereof the more cheaply manufactured and easily assembled spur gearing without in any way reducing the power transmitted by the internal gearing disclosed in the said patent.

Other objects of the invention will become apparent as the detailed description thereof proceeds.

In the drawing, the single figure illustrates a sectional elevation of a mixing machine showing the improved beater drive mechanism in vertical section.

As shown in the drawing, the mixing machine comprises a base 1 having a standard 2 extending upwardly from one end thereof, and terminating at its upper end in a casing 3 having variable speed mechanism arranged therein, as illustrated in my U. S. Patent No. 1,781,321, November 11, 1930, and operated by a handle 4 adapted to lock said mechanism in any desired position of variable speed adjustment. The details of this variable speed drive are not described herein since they form no part of the present invention. It will be understood however that the handle 4 may be adjusted angularly on the casing 3 to vary the speed of rotation of the drive shaft 5.

The drive shaft 5 has a beveled gear 6 suitably secured to the end thereof; and this gear 6 meshes with a similar bevel gear 7 suitably secured on the upper end of a shaft 8 which is journaled in a bearing 9 formed integral with the standard 2 and depending from a horizontal extension 10 of said standard. The upper end of the standard 2 and the upper part of the extension 10 are provided with a rabbet 11 to receive the correspondingly rabbeted lower edge of the casing 3.

The formation of the bearing 9 integral with the extension 10 and standard 2 provides a very rigid bearing for the shaft 8 and greatly reduces the vibration of the shaft as compared with the vibration of the similar shaft shown in Patent No. 1,656,665.

The shaft 8 is mounted on suitable ball bearings in the bearing 9 and at its lower end is provided with a pinion 12 meshing with a pinion 13 secured to a small counter shaft 14, journaled at its upper and lower ends in a bridge member 15 extending inwardly from a gear casing 16 and in a plate 17 detachably connected to the lower end of the gear casing 16 as by bolts 18.

The upper end of the bearing 9 has a large internal gear 19 fixed thereto by means of screws 20 and segmental plates 21 which seat in a suitable groove 22 formed in the periphery of the bearing 9, said segmental plates being secured to the main body of the internal gear 19 by means of the screws 23. A ball bearing 24 surrounds a flange 25 of the said internal gear 19 and serves to support rotatably a planetary gear casing 26 from which the lower gear casing 16 is suspended, and to which the gear casing 16 is connected by bolts or screws 27.

Formed integral with the pinion 13 and rotatably mounted on the shaft 14 is a second pinion 28 which meshes with a large spur gear 29 keyed to the beater spindle shaft 30. This shaft 30 is rotatably mounted at its lower end in a suitable ball bearing 31, one of the elements of which is suitably secured to the closure plate 17 and the other element of which is secured to a hub 32 of a coupling 33 for detachably connecting the beater 34 to the spindle shaft 30.

The upper part of the beater spindle 30 is journaled in a ball bearing 35 secured to the bridge 15; and extends upwardly beyond said bridge to be supported by a ball bearing 36 secured to an upwardly and inwardly projecting extension 37 formed on said bridge 15. A pinion 38 is fixed to the upper end of the beater spindle and meshes with the internal gear teeth 39' formed on the internal gear cup 19.

In operation of the machine it will be evident that rotation of the shaft 5 will cause rotation of the shaft 8 to rotate the pinion 12, and through pinions 13 and 28 will rotate the large square gear 29 which is keyed to the beater spindle 30. It is evident that this gearing forms a reduction gear for rotating the beater 34 about the axis of the spindle 30. The mixing bowl 39 is of such size that when properly located, as by the key 40, on the base 1, its axis is coincident with the axis of the driving shaft 8. The beater spindle 30 is offset from this common axis 41 of the shaft 8 and bowl 39 a suitable distance to cause a planetary rotation of the beater 34 around the axis 41 in the bowl 39 as well as the rotation of the beater about its own axis. It is evident that the rotation of the beater about its own axis in the fixed bowl 39 would cause a planetary rotation of the said beater about the axis 41. In order to ensure a positive planetary rotation of the said beater, the spindle 30 is provided with the pinion 38 in mesh with the teeth 39' of the internal gear cup 19.

It will be evident from inspection of the drawing that if the beater 34 be rotated clockwise, looking downwardly, its planetary rotation about the axis 41 will be anti-clockwise; and this planetary rotation will vary in speed in accordance with the offset between the axis 41 and the axis of the beater spindle and somewhat in accordance with the density of the material being mixed in the bowl 39. It is therefore desirable that the gearing 38 and 39' be so designed as to give a positive planetary rate of rotation about the axis 41 in accordance with the average conditions of operation of the machine. In some instances indeed it might be preferable to eliminate the internal gearing altogether and to effect the planetary rotation of the beater solely by its rotation about the spindle axis, and at a rate depending upon the offset distance of the drive and beater spindles and the density of the material being mixed.

It will be evident from inspection of the drawing also that the spur gearing mounted in the casing 16 can be much more cheaply manufactured than the internal gearing of the machine shown in my Patent No. 1,656,665, and that the several pinions in the said casing 16 can be readily replaced by others of different diameters in order to vary the gear ratio in the drive between the driving shaft and beater spindle.

While I have described the present machine as designed for mixing dough, it must be understood that it is not to be considered as in any way limited to any particular use nor in any other way except as may be imposed therein by the scope of the claim appended hereto or which may be allowed in this application.

What I claim is:

In a mixing machine, a standard having a head extending laterally therefrom, a bearing extending downwardly from said head, a drive shaft journaled in said bearing and having a pinion secured to the lower end thereof, a casing rotatably mounted on the upper end of said bearing, a beater spindle rotatably mounted in said casing parallel to said shaft, a spur gear secured to the lower end of said spindle, an internal gear fixed to said bearing and enclosing the upper end of said spindle, a pinion on the upper end of said spindle meshing with the teeth of said internal gear, a second shaft journaled in said casing parallel to the first named shaft, and gears on said second shaft connecting the first named pinion operably to said spur gear, and means for rotating said drive shaft.

In testimony whereof I affix my signature.

WALTER F. DEHUFF.